United States Patent [19]

Lowther

[11] Patent Number: 5,215,781
[45] Date of Patent: Jun. 1, 1993

[54] METHOD FOR TREATING TUBULARS WITH A GELATIN PIG

[75] Inventor: Frank E. Lowther, Plano, Tex.

[73] Assignee: Atlantic Richfield Company, Los Angeles, Calif.

[21] Appl. No.: 851,442

[22] Filed: Mar. 16, 1992

Related U.S. Application Data

[62] Division of Ser. No. 683,164, Apr. 10, 1991.

[51] Int. Cl.$^5$ ............................................. B08D 5/00
[52] U.S. Cl. .................................. 427/11; 134/8; 134/15; 134/22.11; 134/22.14; 134/26; 427/238; 427/239
[58] Field of Search .............. 427/238, 239, 11; 134/8, 22.11, 22.14, 26, 15

[56] References Cited

U.S. PATENT DOCUMENTS 4,254,559  3/1981  Purinton .................................. 34/9

OTHER PUBLICATIONS

Kirk–Othmer, third ed., vol. 11, Gelatin, pp. 711–715.

*Primary Examiner*—Bernard Pianalto
*Attorney, Agent, or Firm*—Drude Faulconer

[57] ABSTRACT

An ablating gelatin pig for use in tubulars which can easily negotiate the bends, etc in a tubular. Due to the properties of gelatin, the pig will ablate thereby depositing a protective layer onto the wall of the tubular. The pig can be molded outside the tubular or it can be formed in situ. The pig is formed by mixing common gelatin with a heated liquid and then allowing the mixture to cool to ambient temperature. Preferably, the liquid includes a treating solution (e.g. corrosion inhibitor, drag reducer, etc ) which is to be used to treat the pipeline. In some applications, a slug of the treating solution is also passed through the pipeline between two ablating gelatin pigs. For high temperatures applications, a hardener may be added to the pig to increase the melting temperature of the pig and/or a slug of the hardener can also be passed through the pipeline between two ablating gelatin pigs if necessary.

11 Claims, 2 Drawing Sheets

METHOD FOR TREATING TUBULARS WITH A GELATIN PIG

This is a division of application Ser. No. 07/683,164, filed Apr. 10, 1991.

DESCRIPTION

1. Technical Field

The present invention relates to an ablating gelatin pig for use in tubulars and in one of its aspects relates to a pig formed from gelatin which preferably contains a treating solution, e.g. corrosion inhibitor, drag reducer, etc., wherein the pig will ablate as it passes through the tubular to thereby deposit a layer of gelatin and treating solution onto the wall of the tubular.

2. Background Art

Most tubulars, e.g. pipelines, must be treated periodically to extend their operational life and/or to improve and maintain their operating efficiencies. For example, pipelines used for transporting crude oil and/or natural gas which contain even small amounts of water routinely experience severe corrosion problems which, if not timely treated, can result in early failure of the line. Also, the interior surfaces of the pipes have a substantial "roughness" even when new which increases with scaling, pitting, etc. during operation. As this roughness increases, the friction or "drag" between the pipe wall and the fluids flowing therethrough substantially increases thereby substantially reducing the flowrate through the pipeline.

In most known corrosion and drag reduction treatments of tubulars, a layer or film of an appropriate treating solution, i.e. corrosion inhibitor or drag reducer, is deposited onto the interior surface or wall of the pipeline. In corrosion treatment, the film of corrosion inhibitor protects the pipe wall from contact with water or other electrolytes or oxidizing agents while in drag reduction, the film of drag reducer fills in the pits, etc. in the pipe wall to smooth out the wall surface to thereby reduce the friction between the flowing fluids and the pipe wall. In still other instances, the pipeline is treated for other problems, e.g. bacteria buildup, etc. wherein different treating solutions may be used, e.g. biocides, herbicides, etc.

There have been several techniques proposed for providing a film of treating solution onto the wall of a tubular. For example, probably the most commonly-used technique in flowing pipelines is to merely add the treating solution to the fluids which are flowing through the pipeline and/or periodically flowing a slug of the liquid treating solution through the line. Due to the properties of treating solution, it migrates outward against the pipe wall and adheres thereto; hopefully forming a relatively uniform layer or thin film on the entire surface of the wall. Of course, insuring that a uniform layer of solution will actually be deposited onto the wall of a pipeline through which fluids are flowing is extremely difficult, if possible at all. Further, the amount of treating solution that must be added to the flowing fluids is several magnitudes greater than is required to form the thin layer of film on the pipe wall so large volumes of solution are wasted with no benefits being derived therefrom. As can be imagined, the large volumes of excess solution required for this technique makes it very expensive.

Still further, the excess and unused solution in the treating solution has been found to "coat" any particulates, e.g. sand, entrained in the flowing fluids which seriously affects the processing of the fluids once they have reached their distination since it extremely difficult to separate the coated particles from the fluids with standard equipment.

Other techniques for treating tubulars involve flowing slugs of treating solution between structural plugs or "pigs" (i.e. members that move free in the pipeline and act as pistons) or dispensing the solution directly onto the wall from specially-designed pigs as they move through the pipeline. In addition to the costs involved in the use of excess solution and the uncertainty of providing a uniform layer of solution on the wall, there are several other drawbacks involved in using structural pigs in the treatment of tubulars. For example, special pig "launchers" and "catchers" have to be built and installed into the pipeline which adds substantially to the cost and handling problems. Also, structural pigs are substantially rigid and have a constant, fixed diameter which hinders the pig from negotiating bends in the pipeline and limit its ability to pass through restricted diameters (e.g. chokes) in the line.

One tubular treating technique which overcomes many of the drawbacks associated with the above-discussed prior art methods is one which uses a "gelled" pig or pigs, see Canadian Patent 957,910. The gelled pig is formed by gelling a liquid hydrocarbon with a gelling agent, e.g. alkyl orthophosphate ester, and an activator, e.g. sodium aluminate. This pig, which may also contain a corrosion inhibitor, is forced through the pipeline by either a liquid or a gas to deposit a corrosion-protective layer on the pipe wall. This technique is attractive since gelled pigs have several advantages over structual pigs, e.g. gelled pigs resiliently deform to (1) pass through tubulars of differenting diameters; (2) pass through line restrictions such as chokes; and (3) compress to expand radially to thereby remain in contact with the wall of the pipe over long distances.

SUMMARY OF THE INVENTION

The present invention provides an ablating gelatin pig for use in tubulars which is capable of undergoing large deformations as it passes through the tubular and then quickly and forcibly returning substantially to its original configuration. This allows the pig to easily negotiate the bends, restrictions, obstacles, etc. which may be encountered by the pig as it moves through the tubular. Due to the properties of gelatin, the temperature in the tubular and/or the heat generated by the pig moving along in contact with the interior wall of the tubular will cause the pig to ablate to thereby deposit a layer of gelatin (and treating solution if present in the pig) onto the wall. The pig can be molded and inserted into the tubular through a simple inlet conduit or it can be formed in situ so there is no need for an expensive and cumbersome pig "launcher" at the upstream end of the tubular. Further, the pig can be sized so that it will be substantially used up by the time it reaches its destination, so there is no need for a pig "catcher" at the downstream end of the tubular.

More specifically, the ablating gelatin pig of the present invention is comprised of a mass of gelled gelatin which is adapted to be continuously compressed longitudinally by the fluids flowing through a tubular, e.g. pipeline, so that it will expand radially to contact the interior wall of the pipeline as the mass moves therethrough. The mass of gelled gelatin is formed by mixing common gelatin (e.g. commercial grade A or B gelatin)

with a heated liquid (e.g. about 170° F.) and then allowing the mixture to cool to ambient temperature (less than about 100° F.).

The mixture may be cooled in a mold before inserting the pig into the pipeline or it can be formed in situ within the pipeline, itself. Preferably, the liquid used to form the mixture includes a treating solution, e.g. corrosion inhibitor, drag reducer, biocide, herbicide, etc.) which is to be used to treat the pipeline. In some applications, a slug of the treating solution can be passed through the pipeline between the pig and a second ablating gelatin pig to supply additional treating solution onto the wall of the pipeline if needed or desired.

When temperatures in the pipeline are high enough to effective the layer on the wall, a hardener, e.g. an aldahyde, is added to the gelatin-heated liquid mixture before it is cooled to increase the temperature at which the gelled gelatin will melt and/or a slug of hardener is passed through the pipeline between two ablating gelatin pigs to react with and harden the layer which has been deposited on the wall by the front pig.

BRIEF DESCRIPTION OF THE DRAWINGS

The actual construction, operation, and apparent advantages of the present invention will be better understood by referring to the drawings in which like numerals refer to like parts and in which.

BEST KNOWN MODE FOR CARRYING OUT INVENTION

In accordance with the present invention, a method and apparatus is provided for treating tubulars wherein a relatively thin film or layer of a treating solution is deposited onto the wall of the tubular by a gelatin pig as it passes through the tubular. As used herein, "tubular" is intended to include any pipe or conduit through which fluids (i.e. liquids and gases) and solids (i.e. particulates) are flowed. While the present invention will be described primarily in relation to a substantially horizontal pipeline which carries crude oil, natural gas, and/or like hydrocarbon products, an embodiment will also be described for treating substantially vertical and/or horizontal tubulars such as well casings and tubings.

In the present invention, a semi-solid, jelly-like plug or "pig" is formed from gelatin which contacts the interior wall of the pipeline as the pig passes therethrough. Geletin is a material which is capable of recovering from large deformations quickly and forcibly which allows the pig to easily negotiate bends, constrictions, and the like in the pipeline. Due to the ambient heat in the pipeline and flowing fluids and/or the heat generated by the moving pig against the wall of the pipe, the geletin pig "ablates" to deposit a layer of gelatin which may include a treating solution onto the pipe wall.

As is well known, "gelatins" are high molecular weight polypeptides derived from collagen which, in turn, is the primary protein component of animal connective tissue (e.g. bones, skin, hides, tendons, etc.). Gelatin, which is commonly used in foods, glues, photographic and other products, does not exist in nature and is a hydrolysis product obtained by hot water extraction from the collageous raw material after it has been processed with acid, alkaline, or lime. The viscosity of aqueous gelatin solutions increases with increasing concentrations and decreasing temperatures. For a more complete description and discussion of gelatin, its compositions and properties, see ENCYCLOPEDIA OF CHEMICAL TECHNOLOGY, Kirk-Othmer, 3rd Edition, Vol. 11, J. Wiley & Sons, N.Y., pps. 711 et sec.

Figure 1:
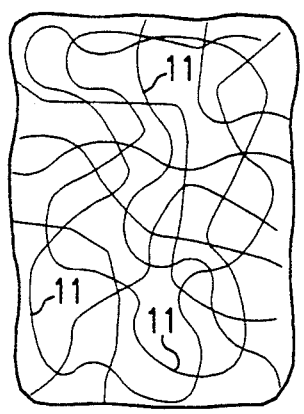
FIG. 1 is an idealized representation of gelatin molecules in a cooled aqueous solution.
Figure 2:
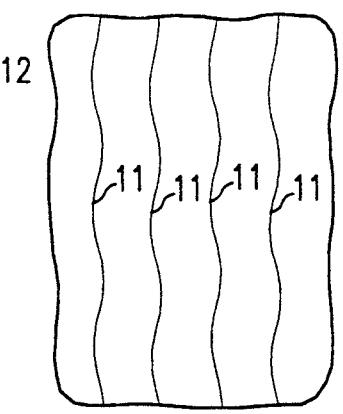
FIG. 2 is an idealized representation of the gelatin molecules of FIG. 1 in a heated state.
Figure 3:
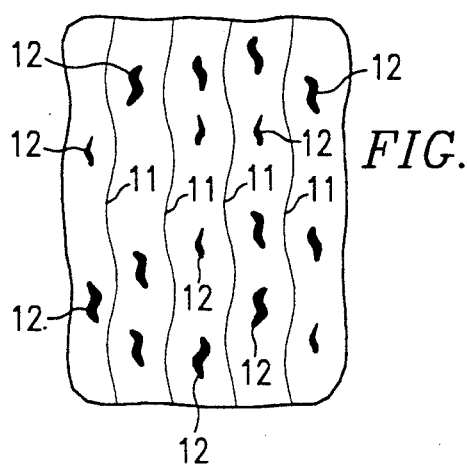
FIG. 3 is an idealized representation o: the heated gelatin molecules of FIG. 2 with molecules of a treated solution blended therein.
Figure 4:
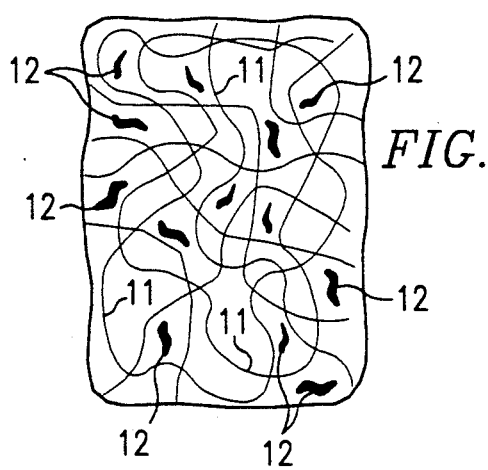
FIG. 4 is an idealized representation of the gelatin and treating solution molecules of FIG. 3 after cooling.

In some instances, the gelatin, itself, will act to some degree as a treating agent, (e.g. as a corrosion inhibitor and/or a drag reducer) but preferably, a separate treating solution is incorporated into the pig when it is formed. Referring now to the drawings, FIG. 1 is a highly idealized representation of an aqueous solution of gelatin molecules 11 as they appear in a cooled state while FIG. 2 represents the molecules as they appear when heated (e.g. above 180° F.). Molecules of a treating solution 12 are blended into the hot gelatin solution (FIG. 3) and are trapped therein by the gelatin molecules 11 as the gelatin-treating solution is cooled back to room temperature (FIG. 4).

In the present invention, if the treatment of a tubular is primarily to inhibit corrosion, the treating solution 12 is comprised of almost any known corrosion inhibitor of the type used to treat tubulars. Examples of good corrosion inhibitors are (1) an aqueous blend of fatty acid imidazoline quaternary compound and alcohol, e.g. commercially-available as NALCO 3554 INHIBITOR; (2) an alkylamide polyamide fatty acid sulfonic acid salt in a hydrocarbon solvent, e.g. VISCO 945 CORROSION INHIBITOR; (3) an imidazoline fatty acid, e.g. OFC C-2364 CORROSION INHIBITOR. For examples of other corrosion inhibitors, see co-pending U.S. Pat. application 07/566,186, filed Aug. 13, 1990 now U.S. Pat. No. 5,020,561, issued Jun. 4, 1991 and commonly-assigned with the present invention.

If the treatment of a tubular is primarily to reduce drag, any known drag reducer of the type used to reduce drag in tubulars can be incorporated into the gelatin pig. For example, many of the above-identified corrosion inhibitors are also good drag reducers thereby producing the combined benefits of reducing drag and inhibiting corrosion. Also, high molecular weight (e.g. $10^6$) homopolymers, e.g. polyethylene oxide, are good drag reducers in that the high weight molecules at least partially "fill" any indentations in the pipewall to "smooth" out the roughness of the wall thereby reducing drag between the pipewall and the flowing fluids. Other treating solutions such as biocides, herbicides, etc. can be incorporated into the ablating gelatin pig if desired for a particular treatment.

In formulating the gelatin pig of the present invention, it has been found that the hardness (i.e. firmness of the cooled gelatin) is primarily dependent on the amount of gelatin in the pig and is relatively independent on the composition of the water/treating solution used with the gelatin. For example, a pig formed with approximately 17% gelatin and a liquid comprised of 30% water and 70% treating solution (e.g. NALCO 3554 INHIBITOR) has substantially the same hardness as that of a pig formed with the same amount of gelatin and a liquid comprised of 70% water and 30% treating solution (NALCO 3554). While it should be recognized that the exact formulation of a particular gelatin pig may vary with the actual components used, the environoment in which the pig is to be used, the treatment to be carried out, etc., the following example illustrates a typical composition of a gelatin pig in accordance with the present invention:

100 parts of a treating solution (e.g. NALCO 3554) is mixed thoroughly with 100 parts by weight of hot water (180° F). 60 parts by weight of gelatin is blended into the hot liquid mixture. The temperature of the gelatin-liquid mixture at this point should be at least 170° F. The gelatin-liquid mixture is allowed to cool to ambient temperature (e.g. room temperature) to thereby form the gelatin mass which becomes the pig. The gelatin-hot liquid mixture may be poured into an appropriate mold where it is allowed to cool to produce a pig basically in the shape of the mold. Such shapes may include cylindrical plugs, bullet-shaped plugs, fish-tailed plugs, etc. or almost any other shape desired for a specific application.

Figure 5:
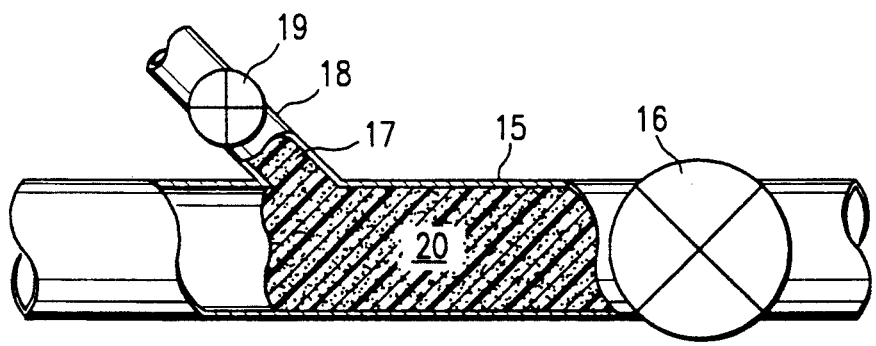
FIG. 5 is an elevational view, partly in section, of an ablating gelatin pig being formed in situ within a pipeline.

While the pig may be formed in a mold and then inserted into the tubular, it is sometimes preferable to mold the pig in situ inside the tubular, itself. Referring again to the drawings, FIG. 5 discloses a tubular (pipeline 15) having a valve 16 therein. A gelatin-hot liquid mixture 17 (e.g. at 170° F) is flowed into pipeline 15 and up against closed valve 16 through an inlet conduit 18 having a valve 19. The gelatin-liquid mixture builds up in the pipeline and is allowed to cool to form the gelatin pig 20. Valve 19 is then closed and valve 16 is opened. Flow is then established in the pipeline behind pig 20 which forces it through open valve 11 and on through pipeline 15. Due to the properties of gelatin, pig 20 will deform to pass through the restrictive diameter of valve 11 and then will immediately substantially return to its original configuration after passing therethrough.

Figure 7:
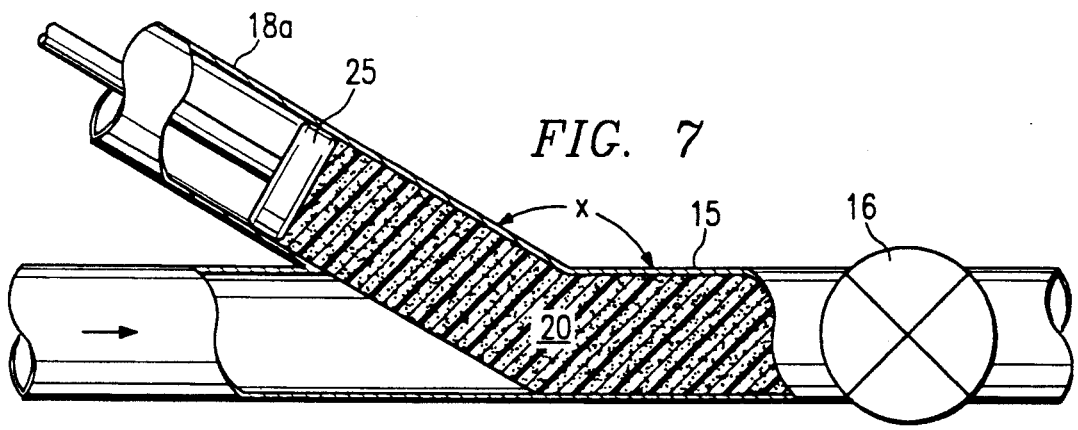
FIG. 7 is an elevational view, partly in section, of another embodiment of an ablating gelatin pig being formed in a pipeline.

FIG. 7 illustrates still another technique for forming pig 20. Pig 20 can be formed in situ completely within inlet 18a or it can be formed in situ partially within inlet 18a and partially within pipeline 15 whereby it has a natural angle "x" (FIG. 7) along its length when cooled. Since the gelatin pig is easily deformable to conform to the diameter of pipeline 15, it can easily be pushed into the pipeline 15 by piston 25 or the like even if the pig is formed with an angle therein. Further, the diameter of inlet 18a may actually be larger or smaller than the diameter of the pipeline. If the diameter of the pig is larger, it will be compressed upon entering pipeline 15 thereby providing additional outward pressure which aids in forcing the periphery of the pig against the wall of the pipeline as it moves therethrough.

The pressure from the fluids being pushed ahead of pig 20 will act on the leading face of the pig while the pressure of the fluids pushing the pig will act on its rear face. These opposite acting pressures radially-compress pig 20 along its longitudinal axis to continuously force the periphery of pig 20 into contact with the pipewall at all times, even as the material in the pig ablates against the wall. This is true regardless whether the diameter of the pig is smaller, larger, or approximately the same as the diameter of the pipeline so that the pig is always in contact with the wall during operation.

Figure 6:
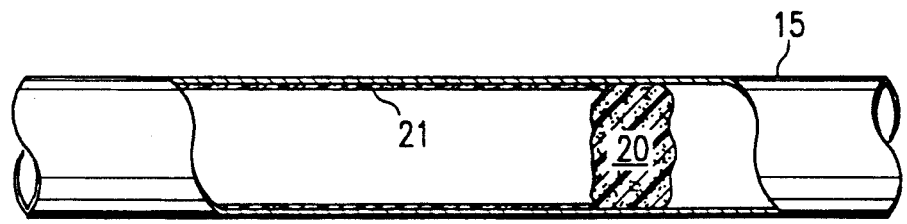
FIG. 6 is an elevational view, partly in section, of the ablating pig of FIG. 5 after it has partially passed through the pipeline.

The temperature of the pipeline 15 and/or the heat generated by pig 20 as it moves along in contact with the interior wall of the pipeline causes the gelatin pig to ablate thereby depositing a layer 21 (FIG. 6) of combined gelatin and treating solution onto the pipewall. The temperature at which a typical gelatin pig ablates is around 100° F.

Figure 10:
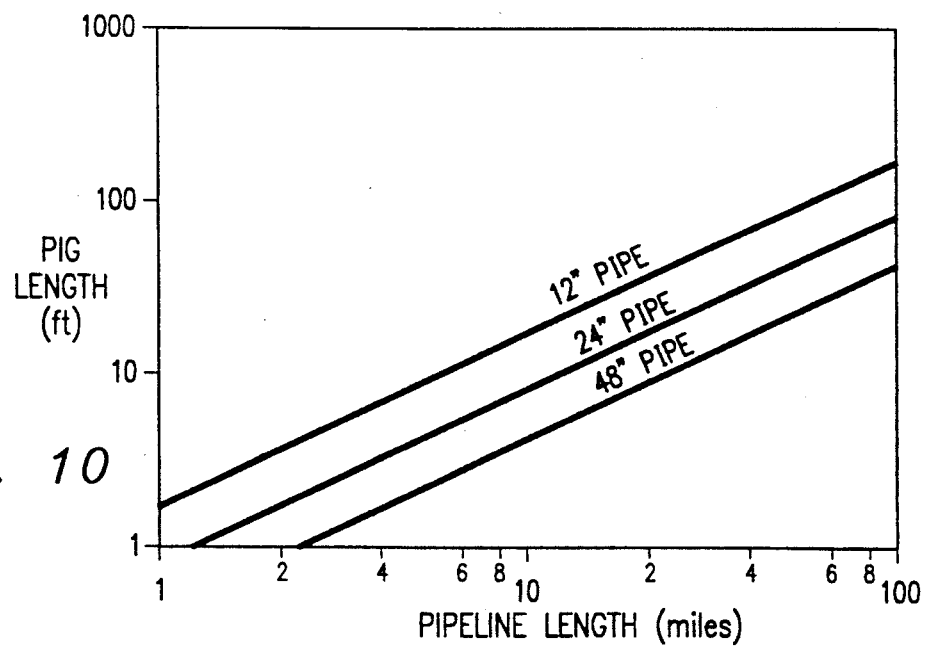
FIG. 10 is a representative graph plotting the length of pig required to provide a protective layer against the lengths of different diameter tubulars.

Pig 20 is sized so that it effectively will be consumed by ablation when its reaches its final destination in the pipeline 15 so there is no need to install a pig "catcher" in the pipeline. The size of a particular pig can be determined from basic geometrical calculations based on the diameter of the tubular to be treated, the rate of ablation, the thickness of layer 21, etc. FIG. 10 shows a graph which is representative of the length of a typical ablating gelatin pig that would be required to produce a layer 21 having a thickness of 3000 microinches over a specified length of different diameter pipelines. As seen from the graph, the required length of some pigs will be substantial (e.g. 100 feet). However, it should be understood that the such pigs do not need to formed as a single integral unit. That is, the pig may be molded or formed in several, individual sections of shorter lengths and then positioned one behind the other whereby the sections effectively function as an integral unit during operation. The sections do not have to be physically joined or connected since all will abut and be pushed through the pipe by the flowing fluids as if they formed an integral unit.

Figure 8:
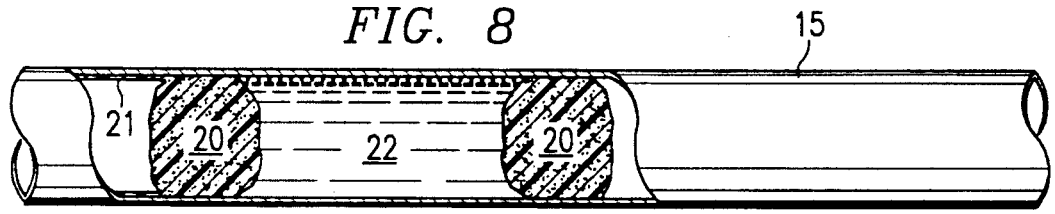
FIG. 8 is an elevational view of a tubular treating method using two ablating gelatin pigs.
Figure 9:
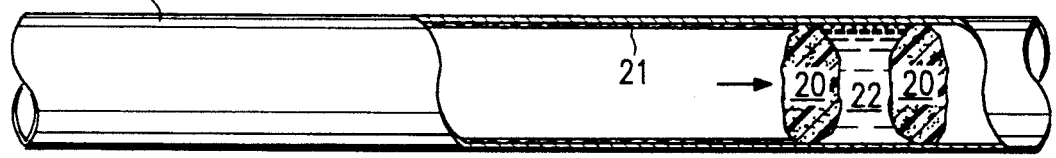
FIG. 9 is an elevational view, partly in section, of the method of FIG. 9 after the pigs have partially passed through a pipeline.

In some tubular treatments in accordance with the invention, it may be desirable or necessary to treat the tubular with a treating solution in addition to that contained in the pig. For example, as illustrated in FIGS. 8 and 9, a slug 22 of treating solution is positioned in pipeline 15 between two ablating gelatin pigs 20 wherein solution from the slug 22 is deposited onto the pipewall as it is carried through the pipeline between the pigs 20. Again, pigs 22 are sized so that they will be substantially comsumed by ablation by the time they reach their destination (FIG. 9) so there is no need to recover the pigs from the pipeline.

In other tubular treatments, the ambient temperature in the tubular may be high enough (e.g. substantially above 100 ° F.) to seriously affect the ability of layer 21 to adhere to the pipewall after it has been deposited thereon. That is, excessive temperatures may cause the gelatin in layer 21 to "melt" and be swept away by the fluids flowing in the pipeline. Accordingly, in accordance with one embodiment of the present invention, a "hardener" is used to react with the gelatin to protect the gelatin against softening or melting at the pipeline temperatures. The hardener toughens the gelatin in layer 21 and makes it resistant to abrasion. It also increases the apparent viscosity of the gelatin and the temperature at which the gelatin will melt.

Examples of such hardeners (e.g. formaldehydes) are those used to harden gelatin in photography applications, see THE THEORY OF THE PHOTOGRAPHIC PROCESS, Third Edition, The Macmillan Co., N.Y. Chapter 3, pps. 45-60. The hardener may be added to the gelatin-hot liquid mixture during the formation of the pig to contol the melting or ablating point of the pig, itself, or the hardener can be positioned between two pigs, as shown in FIG. 8, whereby it comes into contact with the gelatin after layer 21 has been deposited onto the pipewall.

What is claimed is:

1. A method for treating a tubular comprising:
    passing a pig formed of a mass of gelled gelatin through said tubular wherein said pig is of a size to contact the interior wall of said tubular ablate to deposit a layer of gelatin on said wall, said mass comprising;
    a mixture of (a) common gelatin of the type derived from collagen and used in foods, glues, and the like and (b) a heated liquid which is then cooled to allow said gelatin to gel to form said pig.

2. The method of claim 1 wherein said liquid includes: a treating solution.

3. The method of claim 2 wherein said treating solution comprises:
    a corrosion inhibitor.

4. The method of claim 2 wherein said treating solution comprises:
    a drag reducer.

5. The method of claim 2 including:
    passing a slug of treating solution through said tubular between said mass of gelled gelatin and a second mass of gelled gelatin.

6. The method of claim 1 wherein said heated liquid is at a temperature of about 170° F. and said mixture is cooled to a temperature less than about 100° F.

7. The method of claim 6 wherein said pig is formed by allowing the gelatin-heated liquid mixture to cool in a mold before it is inserted into said tubular.

8. The method of claim 6 wherein said gelatin and heated liquid are mixed in said tubular and allowed to cool therein to form said pig in situ in said tubular.

9. The method of claim 1 including:
    adding a hardener to said gelatin and said heated liquid before cooling for increasing the temperature at which the gelled mass of gelatin will ablate.

10. The method of claim 9 wherein said hardener comprises:
    an aldehyde.

11. The method of claim 1 including:
    passing a solution containing a hardener through said tubular behind said pig to react with said layer on said wall to increase the temperature at which said layer will melt.

* * * * *